United States Patent
Baumann et al.

(10) Patent No.: US 7,364,021 B2
(45) Date of Patent: Apr. 29, 2008

(54) WHEEL BRAKE

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE);
Bernd Goetzelmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/960,961

(22) Filed: Oct. 12, 2004

(65) Prior Publication Data

US 2005/0121267 A1 Jun. 9, 2005

(30) Foreign Application Priority Data

Oct. 14, 2003 (DE) ................. 103 47 792

(51) Int. Cl.
*F16D 55/08* (2006.01)

(52) U.S. Cl. ............... 188/72.7; 188/72.1; 188/151 R

(58) Field of Classification Search ........... 188/70 B, 188/72.2, 72.6, 72.7, 73.1, 156, 157, 342, 188/343, 218 R, 218 XL, 72.1, 151 R; 303/3, 303/15, 113.2, 122

See application file for complete search history.

(56) References Cited

U.S. PATENT DOCUMENTS

| | | | | |
|---|---|---|---|---|
| 3,670,854 A * | 6/1972 | Maci | ................ | 188/71.6 |
| 3,743,060 A * | 7/1973 | Hendrickson | ................ | 188/72.2 |
| 4,181,366 A * | 1/1980 | Dobner | ................ | 303/3 |
| 4,353,441 A * | 10/1982 | Roberts | ................ | 188/328 |
| 5,421,643 A * | 6/1995 | Kircher et al. | ................ | 303/3 |
| 5,632,534 A * | 5/1997 | Knechtges | ................ | 303/152 |
| 5,890,778 A * | 4/1999 | Sager | ................ | 303/186 |
| 6,006,869 A * | 12/1999 | Rancourt et al. | ................ | 188/71.5 |
| 6,139,117 A * | 10/2000 | Shirai et al. | ................ | 303/3 |
| 6,318,513 B1 | 11/2001 | Dietrich et al. | | |
| 6,550,598 B2 * | 4/2003 | Drennen | ................ | 192/219.4 |
| 2004/0112693 A1 * | 6/2004 | Baumann et al. | ................ | 188/218 XL |

FOREIGN PATENT DOCUMENTS

| | | | |
|---|---|---|---|
| DE | 19732168 C1 * | 1/1999 | |
| DE | 198 10 593 A1 | 6/1999 | |
| DE | 100 56 451 A1 | 5/2002 | |
| WO | WO-9937519 A1 * | 7/1999 | |
| WO | WO-0210609 A1 * | 2/2002 | |
| WO | WO-0240887 A1 * | 5/2002 | |

* cited by examiner

*Primary Examiner*—Melody M. Burch
(74) *Attorney, Agent, or Firm*—Ronald E. Greigg

(57) ABSTRACT

The invention relates to a wheel brake for a motor vehicle including an electromechanical actuating device and a hydraulic actuating device, which are redundant. In this way, the likelihood of failure of the wheel brake is reduced. A self-boosting device increases a braking force of the wheel brake, so that an (underpressure) brake booster can be dispensed with. Wheel slip control is possible in a simple way by hydraulic actuation of the wheel brake and superposition of a braking force regulation on the electromechanical actuating device. The wheel brake includes a support member on the side of a friction brake lining opposite a brake body. The support member has two wedge inclines and a flattened middle portion on a side opposite the friction brake lining. The pressure fluid actuating device has a tappet resting on the flattened middle portion.

8 Claims, 3 Drawing Sheets

WHEEL BRAKE

BACKGROUND OF THE INVENTION

1. Field of the Invention

The invention relates to an improved wheel brake for a motor vehicle.

2. Description of the Prior Art

In the field of passenger cars and motorbikes, hydraulic wheel brakes, often in the form of disk brakes, are usual today. Hydraulic means that the wheel brakes have a hydraulic actuating device with a piston-cylinder unit, with which a friction brake lining can be pressed for braking against a brake body that is connected to a vehicle wheel in a manner fixed against relative rotation. The brake body, in the case of a disk brake, is a brake disk. Hydraulic wheel brakes are familiar to one skilled in the art and therefore need not be described in further detail here.

In utility vehicles, such as trucks, compressed-air-actuated (pneumatic) wheel brakes are employed. These too are familiar to one skilled in the art and need not be described in detail here. Both hydraulic and compressed-air-actuated wheel brakes can be described by the term "pressure-fluid-actuated wheel brakes".

Recently, developments have been made in electromechanical wheel brakes, that is, wheel brakes that have an electromechanical actuating device. One example of this is disclosed by International Patent Application WO 96/03301. This known electromechanical wheel brake has an electric motor and a spindle drive as a rotation-to-translation conversion gear; connected between the electric motor and the spindle drive is a planetary gear, as a step-down gear. The spindle drive converts a rotating driving motion of the electric motor into a translational motion for pressing a friction brake lining against a brake body. The electric motor, the rotation-to-translation conversion gear, and if present the step-down gear form the electromechanical actuating device of the wheel brake.

The known pressure-fluid-actuated and electromechanical wheel brakes may in principle be embodied not only as disk brakes but also as drum brakes or in any arbitrary other form of brake construction.

OBJECT AND SUMMARY OF THE INVENTION

The wheel brake of the invention has an electromechanical actuating device and a pressure fluid actuating device, with which devices a friction brake lining can be pressed against a brake body for braking. The two actuating devices are redundant; that is, for braking the friction brake lining can be pressed against the brake body selectively with the electromechanical actuating device or with the pressure fluid actuating device or with both actuating devices.

The wheel brake of the invention has the advantage of increased availability; if one of the two actuating devices fails, braking can be done with the other actuating device. Depending on the design and construction of the wheel brake, the full braking force can be generated with each of the two actuating devices, or only a reduced braking force can be generated with one of the two actuating devices; in each case, braking is possible even if one of the two actuating devices fails. Compared to a solely electromechanical actuating device, this has the advantage that increased demands need not be made of an electrical energy supply, such as a second battery, and an increased electrical voltage of an on-board motor vehicle electrical system.

Advantageous features and refinements of the invention are disclosed. One such feature provides a self-boosting device, which converts a frictional force, exerted in braking by the rotating brake body on the friction brake lining pressed against the brake body, into a contact pressure, which in addition to a contact pressure exerted by the actuating device presses the friction brake lining against the brake body. As a result, only some of the contact pressure required for braking has to be brought to bear by the actuating device. The actuating device can as a result be dimensioned for a lesser contact pressure, and hence can be smaller and lighter in weight, while the dynamics of actuating the wheel brake are enhanced. The capability of embodying the actuating device as smaller and lighter in weight is especially important for an electromechanical actuating device, which without the self-boosting device would be large and heavy and therefore difficult to accommodate inside a rim of a vehicle wheel, and which would also increase the unsprung masses of the motor vehicle. The self-boosting device is intended in particular for the electromechanical actuating device of the wheel brake of the invention. If the pressure fluid actuating device likewise has a self-boosting device, then this has the advantage that an underpressure-type or other type of brake booster can be dispensed with. Each actuating device can be provided with its own self-boosting device, or both actuating devices may act on the friction brake lining via one common self-boosting device.

One embodiment provides a mechanical self-boosting device. It may have a wedge mechanism, with a wedge on a back side of the friction brake lining facing away from the brake body (in the case of a disk brake, this brake body is the brake disk), which is braced on a counterpart wedge incline that extends at an oblique angle to the brake body and in the circumferential direction of the brake body. If the friction brake lining is pressed for braking against the rotating brake body, then the rotating brake body exerts a frictional force on the friction brake lining in the direction of an increasingly narrow wedge-shaped gap between the counterpart wedge incline and the brake body. Because of the bracing on the counterpart wedge incline, and because of a wedge effect, a force component arises that presses the friction brake lining against the brake body. Such a wedge mechanism may have a wedge angle that is constant over the length of the counterpart wedge incline or that varies over the length of the counterpart wedge incline, so that the magnitude of self boosting by the self-boosting device varies with displacement of the friction brake lining along the counterpart wedge incline. As a result, for instance for overcoming an air play, that is, a gap between the friction brake lining and the brake body when the wheel brake is not actuated, a high positioning speed of the friction brake lining in the direction of the brake body can be attained at the onset of braking, while at high actuation forces, powerful self boosting can be attained. The term ramp mechanism is also employed for this. A wedge mechanism or ramp mechanism is not the only possibility for a mechanical self-boosting device. For instance, a lever mechanism may be used, with a lever which braces the friction brake lining as it is pressed against the brake body at a support angle oblique to the brake body and as a result brings about the self boosting. The support angle is equivalent to the wedge angle; the wedge mechanism and lever mechanism can be understood as a mechanical analog.

Another feature resides in the use of a wheel-slip control system (ABS) for the electromechanical actuating device. The term "wheel-slip control system" should also be understood to mean a traction control system (TCS) and/or vehicle dynamics control, also known as an electronic stability program (ESP). For wheel slip control, a braking force is brought to bear by the electromechanical actuating device, and if a braked vehicle wheel is tending to lock, this braking force is limited or reduced and optionally modulated, so that the vehicle wheel rotates. Alternatively, the wheel brake of the invention is actuated with the pressure fluid actuating device, and the wheel slip control is superimposed on the electromechanical actuating device if needed. In the case of traction control, a braking force on a driven vehicle wheel that is tending to spin is appropriately built up or increased. As a result, hydraulic components of a hydraulic wheel-slip control system, such as hydraulic pumps and including their electrical drive motors, magnet valves, reservoirs and damper chambers, can all be dispensed with. The wheel-slip control system of the electromechanical actuating device is simpler in its construction and considerably less expensive; the wheel slip control is made simpler and is improved by finer regulation.

BRIEF DESCRIPTION OF THE DRAWINGS

The invention will be better understood and further objects and advantages thereof will become more apparent from the ensuing detailed description of a preferred embodiment, taken in conjunction with the drawings, in which.

DESCRIPTION OF THE PREFERRED EMBODIMENT

Figure 1:
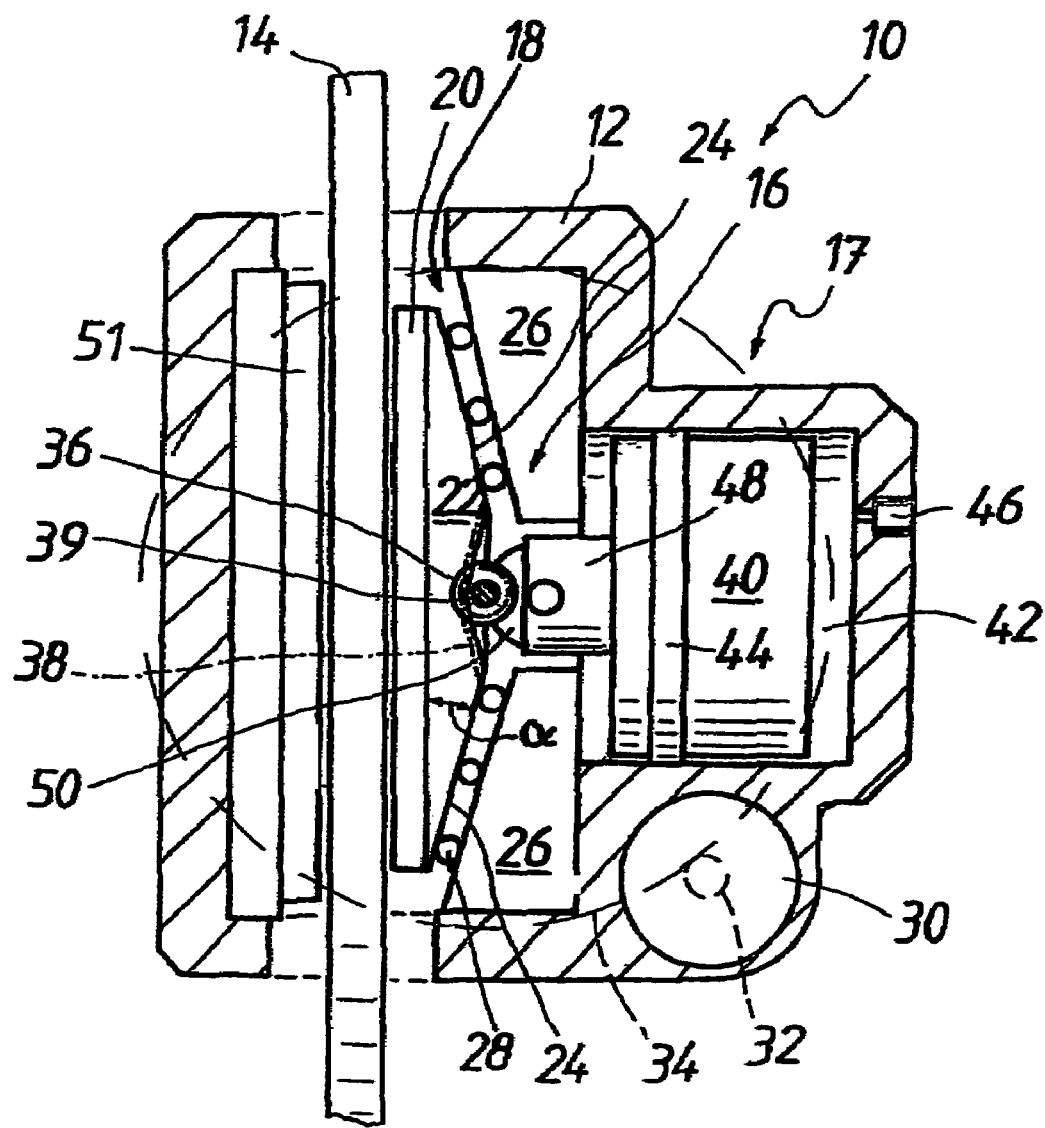
FIG. 1 is a schematic sectional view of a wheel brake of the invention, looking in the direction radially to a brake body.

The wheel brake of the invention, shown in the drawing, is embodied as a disk brake 10 and is intended for use in a motor vehicle, not shown, in particular a passenger car. The disk brake 10 has a brake caliper 12, which is embodied as a floating caliper; that is, it is displaceable transversely to a brake disk 14. The brake disk 14 forms a brake body to be braked of the wheel brake. The disk brake 10 has an electromechanical actuating device 16 and a hydraulic actuating device 17 (or pressure fluid actuating device); thus it is actuatable both electromechanically and hydraulically. The electromechanical actuation and the hydraulic actuation are independent of one another; thus, the disk brake 10 has two redundant actuating devices. The actuating devices 16, 17 will be described in further detail hereinafter.

Moreover, the disk brake 10 has a mechanical self-boosting device 18 with a double-wedge mechanism, which for simplicity will also be called simply a wedge mechanism hereinafter. A double-wedge mechanism was chosen in order to attain self boosting in both directions of rotation of the brake disk 14 (forward travel and reverse travel). A first friction brake lining 20 has a support or double wedge 22, with two wedge inclines 24 on a back side, remote from the brake disk 14. The wedge inclines 24 extend, oriented oppositely to one another, obliquely at an (acute) wedge angle α to a circumferential direction of the brake disk 14. The wedge angle α of the two wedge inclines 24 of the support or double wedge 22 may be of different sizes, but in the exemplary embodiment shown, the wedge angles α of both wedge inclines 24 are the same size; the self boosting is identical in both directions of rotation of the brake disk 14. With its wedge inclines 24, the support or double wedge 22 is braced on two braces 26, which are fixedly disposed in the caliper 12. The braces 26 each have one surface extending parallel to one of the wedge inclines 24, or in other words also obliquely to the brake disk 14 at the wedge angle α. To reduce friction, rollers 28 are disposed as roller bodies between the wedge inclines 24 and the braces 26.

If the first friction brake lining 20 is pressed for braking against the rotating brake disk 14, then the brake disk 14 exerts a frictional force in its direction of rotation on the first friction brake lining 20. The frictional force displaces the first friction brake lining 20 and together with it the support or double wedge 22 in the direction of rotation of the brake disk 14. In the process, the support or double wedge 22 is displaced with the first friction brake lining 20 parallel to one of the two braces 26, or in other words at the wedge angle α obliquely to the brake disk 14. The frictional force exerted on the first friction brake lining 20 by the rotating brake disk 14 displaces the first friction brake lining 20 together with the support or double wedge 22 into an increasingly narrow wedge-shaped gap between one of the two braces 26 and the brake disk 14. Because of a wedge action, the brace 26 exerts a force with a component transversely to the brake disk 14 on the support or double wedge 22 and thus on the first friction brake lining 20, which in addition to a contact pressure exerted by one of the two actuating devices 16, 17 presses the first friction brake lining 20 against the brake disk 14. This increases the contact pressure of the friction brake lining 20, and only some of the contact pressure is brought to bear by one of the two actuating devices 16, 17; the rest of the contact pressure of the first friction brake lining 20 against the brake disk 14 is effected by the self-boosting device 18, which converts the frictional force, exerted by the rotating brake disk 14 on the first friction brake lining 20, into a contact pressure of the friction brake lining 20 against the brake disk 14 in the manner described. In one direction of rotation of the brake disk 14, the support or double wedge 22 cooperates with one of the two braces 26, while in the opposite direction of rotation of the brake disk 14 it cooperates with the other brace 26.

The electromechanical actuating device 16 has an electric motor 30, a gear wheel gear 32, 34, and a rack-gear arrangement 36, 38. The rack 38 is mounted on the support or double wedge 22 of the first friction brake lining 20. It is curved in its center and from its center it extends in two portions in both directions, each parallel to one of the two wedge inclines 24 and one of the two braces 26. A small gear wheel 36 meshes with the rack 38 and together with the rack 38 forms the rack-gear arrangement 36, 38. Via a shaft 39, which is supported rotatably in the caliper 12, the small gear wheel 36 is connected in a manner fixed against relative rotation to a large gear wheel 34. The large gear wheel 34 meshes with a pinion 32 of the electric motor 30. The large gear wheel 34 and the pinion 32 are represented by dashed lines, so as not to hide the parts of the disk brake 10 located beneath them. The large gear wheel 34 and the pinion form the gear wheel gear 32, 34, which is a step-down gear with major speed reduction.

For actuating the disk brake 10, the large gear wheel 34 can be driven to rotate by the electric motor 30 via the pinion 32. With the large gear wheel 34, the small gear wheel 36 connected to it in a manner fixed against relative rotation rotates with it and in turn drives the rack 38 and with it displaces the support or double wedge 22 along with the first friction brake lining 20. The friction brake lining 20 is always displaced in the direction of rotation of the brake disk 14, in order to attain the aforementioned self-boosting effect. The friction brake lining 20 is displaced parallel to the braces 26 and thus obliquely toward the brake disk 14, until it contacts it and brakes it.

Figure 3:
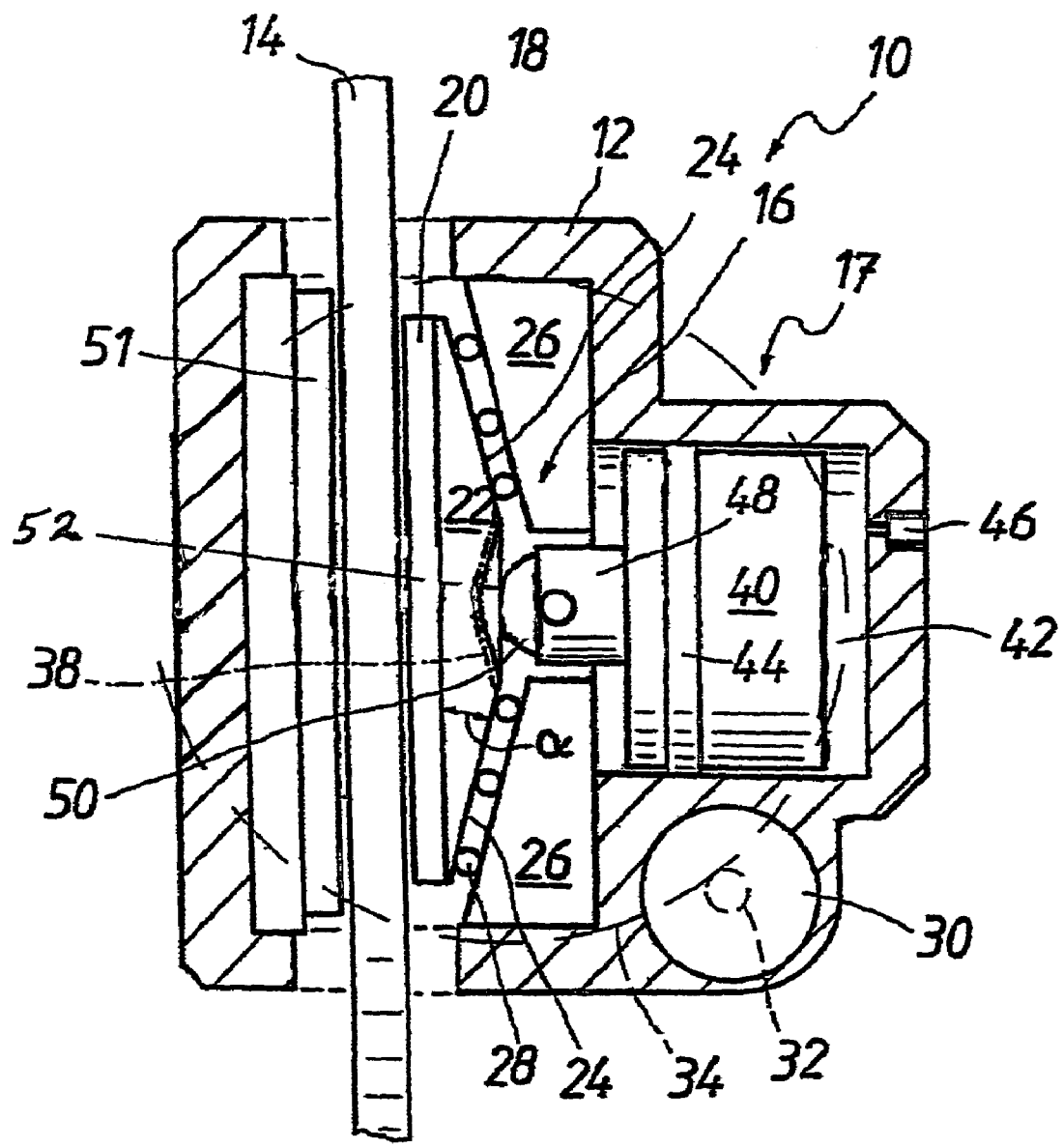
FIG. 3 is schematic sectional view of a wheel brake of the invention, similar to FIG. 1, but with the gear wheel 36 and the shaft 39 omitted.

The hydraulic actuating device 17 includes a piston-cylinder unit 40, 42, with a piston 40 that is received axially displaceably in a cylinder 42. An imaginary center axis of the piston-cylinder unit 40, 42 is oriented perpendicular to the brake disk 14. The cylinder 42 is component of the caliper 12. The piston 40 is sealed off by a sealing ring 44 of square cross section in the cylinder 42. Through a pressure connection 46, an interior of the cylinder 42 and the piston 40 can both be acted upon by a pressure fluid (brake fluid). From the piston 40, a tappet 48 protrudes in the direction of the support or double wedge 22, with which the first friction brake lining 20 can be pressed against the brake disk 14. As more clearly shown in FIG. 3, a roller 50 rotatably supported in the tappet 48 rests on a flattened middle portion 52 between the two wedge inclines 24 of the support or double wedge 22. The roller 50 serves to reduce friction upon a displacement of the first friction brake lining 20 parallel to the brake disk 14.

Both the hydraulic and the electromechanical actuating device 16, 17 are disposed on the same side of the brake disk 14. The hydraulic actuating device 17 also makes use of the self-boosting device 18 described above.

A second friction brake lining 51 rests in the caliper 12, on a side of the brake disk 14 facing away from the first friction brake lining 20 and the two actuating devices 16, 17. In a manner known per se, when the first friction brake lining 20 is pressed against one side of the brake disk 14 for actuating the disk brake 10, this second friction brake lining 51 is pressed by one of the two actuating devices 16, 17 against the other side of the brake disk 14 by displacement of the caliper 12, embodied as a floating caliper, transversely to the brake disk 14. The self-boosting device 18 effects boosting of the contact pressure of the two friction brake linings 20, 51 against the brake disk 14.

An actuation of the disk brake 10 by the electromechanical actuating device 16, as a service brake, is provided. The wheel slip control is also effected by modulation of the braking force by the electromechanical actuating device 16. If the electromechanical actuating device 16 should fail, an actuation of the disk brake 10 with the hydraulic actuating device 17 as an auxiliary brake is possible.

An actuation of the disk brake 10 with the hydraulic actuating device 17 as the service brake and with the electromechanical actuating device 16 as an auxiliary brake can also be done. In the case of hydraulic service braking as well, wheel slip control is effected by modulation of the hydraulically exerted braking force with the electromechanical actuating device 16; the electromechanically exerted contact pressure and braking force is superimposed on the hydraulically exerted contact and braking force. This type of braking force regulation is also contemplated for the case of traction control and/or electronic stability control.

Electromechanical wheel slip control is simpler and less expensive than conventional hydraulic wheel slip control, since it requires only an electronic controller, and a hydraulic portion of a wheel-slip control system with magnet valves and hydraulic pumps is dispensed with. However, power electronics are additionally needed for controlling/regulating the electric motor 30, but this is less expensive than a hydraulic wheel-slip control system.

Since the hydraulic actuating device 17, like the electromechanical actuating device 16, uses the self-boosting device 18, it is possible to dispense with a separate (under-pressure) brake booster, even if the hydraulic actuating device 17 is used for the service braking.

Figure 2:
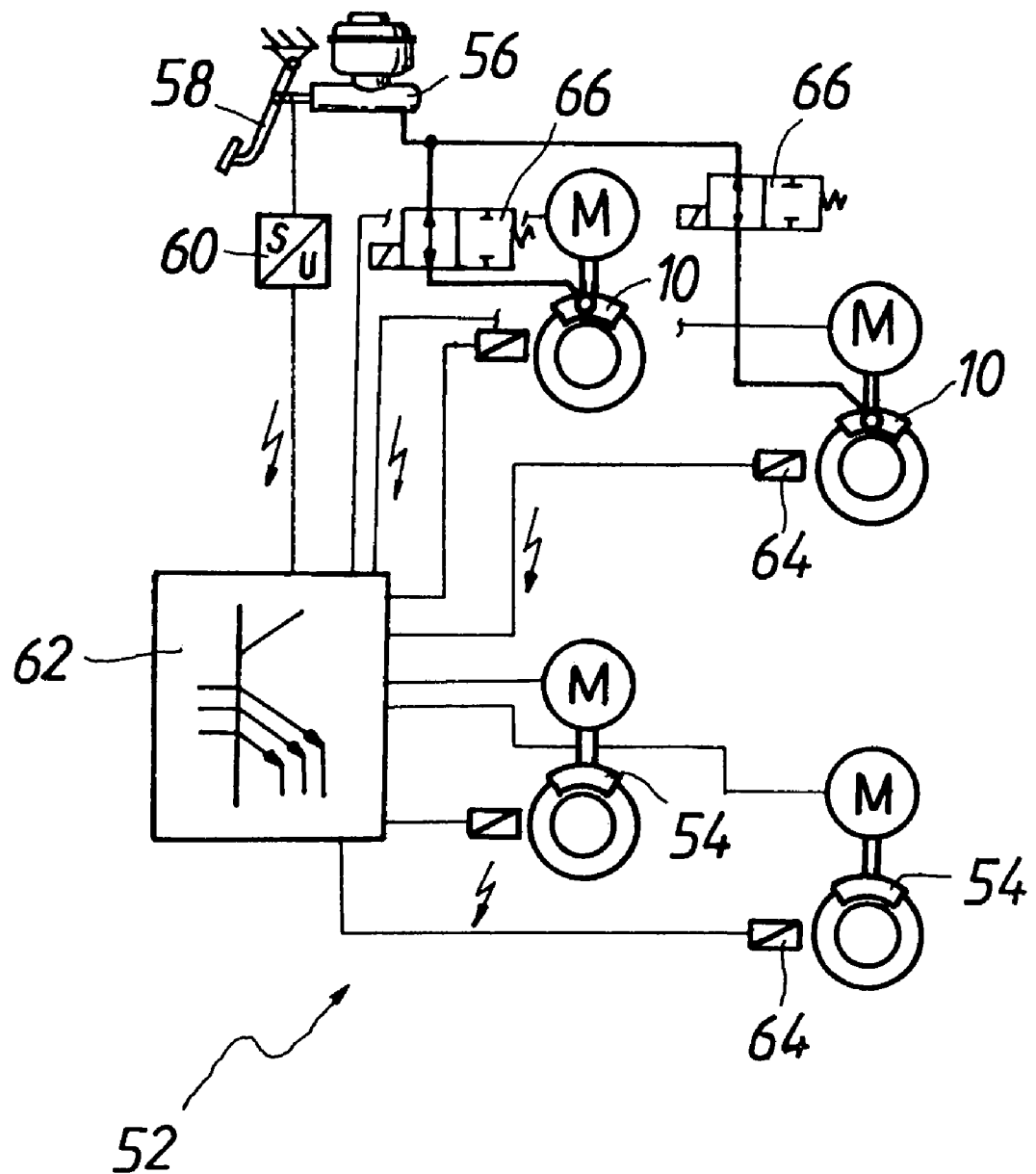
FIG. 2 is a circuit diagram for a vehicle brake system using the wheel brake of FIG. 1 according to the invention.

FIG. 2 shows a combined hydraulic and electromechanical (hybrid) vehicle brake system 52, which is intended for a passenger car. The vehicle brake system 52 has two wheel brakes 10 of the type described above for wheels of the front axle, and two solely electromechanically actuatable wheel brakes 54 for wheels of a rear axle of the passenger car. The two solely electromechanical wheel brakes 54 may have an electromechanical actuating device 16 and a self-boosting device 18, like the wheel brake 10 of FIG. 1; the hydraulic actuating device 17 is dispensed with. For hydraulic actuation, the wheel brakes 10 of the front axle are connected via blocking valves 66 to a hydraulic single-circuit master cylinder 56, which can be actuated with a brake pedal 58. A pedal travel sensor 60 measures a pedal position of the brake pedal 58 and furnishes a signal to an electronic control unit 62, which controls or regulates the vehicle brake system 52. Each vehicle wheel is assigned an rpm sensor 64, which likewise furnishes its signals to the electronic control unit 62. The blocking valves 66 are embodied as 2/2-way magnet valves that are open in their currentless basic position.

For braking, the brake pedal 58 is depressed, and the hydraulic actuating devices 17 (FIG. 1) of the wheel brakes 10 of the front axle are as a result acted upon by pressure, or in other words are actuated hydraulically. The electromechanical actuating devices 16 of the wheel brakes 10 of the front axles are not needed. Because of the self-boosting devices 18 (FIG. 1) of the wheel brakes 10 of the front axle, a brake booster of the usual kind in modern hydraulic vehicle brake systems can be dispensed with.

The wheel brakes 54 of the rear axle are actuated electromechanically; the electronic control unit 62 controls or regulates a braking force as a function of the position of the brake pedal 58.

If one of the vehicle wheels is tending to lock and the electronic control unit 62 ascertains this by means of the wheel rotation sensors 64, what follows is a wheel-specific regulation of brake force and wheel slip (ABS) by means of the electromechanical actuating devices of the wheel brakes 10, 54; at the hydraulically and/or electromechanically actuatable wheel brakes 10 of the front axle, the electromechanical wheel slip control is superimposed on the hydraulic brake actuation. The blocking valves 66 of the wheel brakes 10 of the front axle are closed for wheel slip control. In the event of wheel slip control, a contact pressure that can be maximally exerted by the electromechanical actuating device 16 is greater than a contact pressure of the hydraulic actuating device 17, so that by means of action on the first friction brake lining 20 in a release direction, free rotatability of the brake disk 14 can be attained.

Multiple functions, such as applying the friction brake linings 20, 51 to the brake disk 14 in order to enable actuating the wheel brakes 10, 54 faster in an expected braking event, and/or temporarily applying the friction brake linings 20, 51 during the trip for drying out the brake disk 14 when it is raining are also possible with the vehicle brake system 52.

A hydraulic part and an electromechanical part of the vehicle brake system 52 are completely independent of one another, so that even in the event of a complete failure of either the hydraulic or the electromechanical part of the vehicle brake system 52, the vehicle can still be braked. In the event of failure of the hydraulic part of the vehicle brake system 52, all four vehicle wheels are braked electromechanically; the full deceleration is possible. If the electromechanical part of the vehicle brake system 52 fails, the front wheels can be braked hydraulically with full braking force by the wheel brakes 10. Since typically the front wheels exert the great majority of the braking force, in any case in hard braking, that is, major deceleration, even if the electromechanical part of the vehicle brake system 52 fails major deceleration is still readily possible.

The foregoing relates to a preferred exemplary embodiment of the invention, it being understood that other variants and embodiments thereof are possible within the spirit and scope of the invention, the latter being defined by the appended claims.

We claim:

1. In a wheel brake for a motor vehicle, including a friction brake lining (20) and a plurality of actuating devices with which the friction brake lining can be pressed against a brake body (14) for braking, the improvement wherein the actuating devices comprise both an electromechanical actuating device (16) and a pressure fluid actuating device (17) for pressing the friction brake lining (20) against the brake body (14); wherein the actuating devices (16, 17) are redundant and the contact-pressure forces exerted by the two actuating devices (16, 17) on the friction brake lining (20) are added together; and a support member (22) on the side of the friction brake lining opposite the brake body, the support member having two wedge inclines (24) and a flattened middle portion on a side opposite the friction brake lining, the pressure fluid actuating device having a tappet (48) resting on the flattened middle portion.

2. The wheel brake in accordance with claim 1, wherein the support member (22) is a part of a self-boosting device (18), which converts a frictional force, exerted upon braking by the rotating brake body (14) on the friction brake lining (20) pressed against the brake body (14), into a contact pressure that presses the friction brake lining (20) against the brake body (14).

3. The wheel brake in accordance with claim 1, wherein the support member (22) is a part of a common self-boosting device (18) for the electromechanical actuating device (16) and the pressure fluid actuating device (17).

4. The wheel brake in accordance with claim 1, wherein the electromechanical actuating device (16) comprises a wheel-slip control system (62, 64), which is superimposed on the pressure fluid actuation device (17) of the wheel brake (10).

5. The wheel brake in accordance with claim 1, wherein the wheel brake (10) is a disk brake.

6. The wheel brake in accordance with claim 1, wherein the electromechanical actuating device (16) and the pressure fluid actuating device (17) are disposed on the same side of the brake body (14).

7. In a wheel brake for a motor vehicle, including a friction brake lining (20) and a plurality of actuating devices with which the friction brake lining can be pressed against a brake body (14) for braking, the improvement wherein the actuating devices comprise both an electromechanical actuating device (16) and a pressure fluid actuating device (17) for pressing the friction brake lining (20) against the brake body (14); wherein the actuating devices (16, 17) are redundant and the contact-pressure forces exerted by the two actuating devices (16, 17) on the friction brake lining (20) are added together; and a support member (22) on the side of the friction brake lining opposite the brake body, the support member having two wedge inclines (24) and a flattened middle portion on a side opposite the friction brake lining, the pressure fluid actuating device having a tappet (48) resting on the flattened middle portion, wherein the electromechanical actuating device (16) comprises a wheel-slip control system (62, 64), which is superimposed on the pressure fluid actuating device (17) of the wheel brake (10), and wherein, in wheel slip control, a maximum possible contact pressure of the electromechanical actuating device (16) is greater than a contact pressure of the pressure fluid actuating device (17).

8. A vehicle brake system (52) comprising both electromechanically and hydraulically actuatable wheel brakes (10) on a front axle, and solely electromechanically actuatable wheel brakes (54) on a rear axle, the front axle wheel brakes including both an electromechanical actuating device (16) and a pressure fluid actuating device (17) for pressing a friction brake lining (20) against a brake body (14), wherein the electromechanical actuating device (16) and the pressure fluid actuating device (17) for the front axle wheel brakes are redundant and the contact-pressure forces exerted by the electromechanical actuating device (16) and the pressure fluid actuating device (17) for the front axle wheel brakes on the friction brake lining (20) are added together; and a support member (22) on the side of the friction brake lining opposite the brake body, the support member having two wedge inclines (24) and a flattened middle portion on a side opposite the friction brake lining, and the pressure fluid actuating device having a tappet (48) resting on the flattened middle portion.

\* \* \* \* \*